(12) United States Patent
Wintermantel et al.

(10) Patent No.: US 7,635,743 B2
(45) Date of Patent: Dec. 22, 2009

(54) MOISTURE-CURING COMPOSITION AND HOT-MELT ADHESIVE

(75) Inventors: Matthias Wintermantel, Köln (DE); Walter Meckel, Düsseldorf (DE); Michael Ludewig, Köln (DE)

(73) Assignee: Bayer MaterialScience AG, Leverkusen (DE)

( * ) Notice: Subject to any disclaimer, the term of this patent is extended or adjusted under 35 U.S.C. 154(b) by 94 days.

(21) Appl. No.: 11/301,779

(22) Filed: Dec. 13, 2005

(65) Prior Publication Data

US 2006/0142532 A1 Jun. 29, 2006

(30) Foreign Application Priority Data

Dec. 24, 2004 (DE) ........................ 10 2004 062 653

(51) Int. Cl.
*C08G 18/08* (2006.01)
*C08G 18/16* (2006.01)
*C08G 77/04* (2006.01)
*C08G 77/18* (2006.01)
*C08G 77/28* (2006.01)

(52) U.S. Cl. ............................. 528/59; 528/28; 528/29; 528/38

(58) Field of Classification Search ................. 528/59
See application file for complete search history.

(56) References Cited

U.S. PATENT DOCUMENTS

| 4,433,170 | A | * | 2/1984 | Zimmerman et al. ........ 564/508 |
| 4,474,933 | A | | 10/1984 | Huber et al. .................. 528/26 |
| 5,019,638 | A | | 5/1991 | Müller et al. ................. 528/83 |
| 5,166,302 | A | | 11/1992 | Werner et al. ................. 528/67 |
| 5,190,607 | A | | 3/1993 | Werner et al. ............. 156/331.1 |
| 5,364,955 | A | | 11/1994 | Zwiener et al. ............. 556/418 |
| 5,418,310 | A | | 5/1995 | Kangas ......................... 528/59 |
| 5,436,302 | A | | 7/1995 | Stobbie, IV et al. .......... 525/458 |
| 5,554,709 | A | * | 9/1996 | Emmerling et al. ........... 528/27 |
| 5,558,941 | A | | 9/1996 | Stobbie, IV et al. ...... 428/423.1 |
| 5,559,196 | A | | 9/1996 | Stobbie, IV et al. ......... 525/458 |
| 5,574,114 | A | | 11/1996 | Stobbie, IV et al. ......... 525/440 |
| 5,840,141 | A | * | 11/1998 | Korbel ....................... 156/153 |
| 5,880,167 | A | * | 3/1999 | Krebs et al. ................. 521/155 |
| 5,908,700 | A | * | 6/1999 | Shimizu et al. ........... 428/423.1 |
| 5,968,995 | A | * | 10/1999 | Rizk et al. ................... 521/159 |
| 6,051,527 | A | * | 4/2000 | Savoca et al. ............... 502/167 |
| 6,051,674 | A | * | 4/2000 | Yezrielev et al. .............. 528/45 |
| 6,545,087 | B1 | | 4/2003 | Schmalstieg et al. .......... 525/38 |
| 6,749,943 | B1 | | 6/2004 | Tangen et al. ................ 428/447 |
| 6,756,465 | B1 | * | 6/2004 | Jacobine et al. ............... 528/29 |
| 6,803,412 | B2 | * | 10/2004 | Nguyen-Misra et al. .... 525/102 |
| 6,884,852 | B1 | * | 4/2005 | Klauck et al. ............... 525/458 |
| 7,053,152 | B2 | * | 5/2006 | Krebs et al. ................... 525/63 |
| 7,129,312 | B1 | * | 10/2006 | Krebs et al. ................... 528/59 |
| 7,267,878 | B2 | * | 9/2007 | Primke et al. ............. 428/423.1 |
| 2002/0128419 | A1 | * | 9/2002 | Terry et al. ................... 528/28 |
| 2002/0188068 | A1 | * | 12/2002 | Mack et al. .................. 525/100 |
| 2003/0092831 | A1 | * | 5/2003 | Tangen ........................ 524/589 |
| 2003/0153671 | A1 | * | 8/2003 | Kaszubski et al. ........... 524/492 |
| 2004/0068049 | A1 | * | 4/2004 | Wintermantel et al. ...... 524/589 |
| 2004/0143055 | A1 | * | 7/2004 | Nakata et al. ............... 524/589 |
| 2004/0180155 | A1 | * | 9/2004 | Nguyen-Misra et al. ...... 428/34 |
| 2005/0131188 | A1 | * | 6/2005 | Duch et al. ................... 528/25 |

FOREIGN PATENT DOCUMENTS

EP 0 668 302 A1 8/1995
WO 2004/083296 A2 9/2004

* cited by examiner

*Primary Examiner*—Margaret G Moore
*Assistant Examiner*—Robert Loewe
(74) *Attorney, Agent, or Firm*—Connolly Bove Lodge & Hutz LLP

(57) ABSTRACT

The invention relates to a composition based on alkoxysilane-functional polyurethane prepolymers suitable for a reactive hot-melt adhesive which is stable to storage at a high temperature but cures very rapidly under the action of moisture from the atmosphere or from the materials glued to one another and which is suitable for joining the most diverse materials. The invention also relates to the process for gluing the most diverse substrates using the reactive hot-melt adhesive according to the invention.

13 Claims, No Drawings

MOISTURE-CURING COMPOSITION AND HOT-MELT ADHESIVE

CROSS-REFERENCE TO RELATED APPLICATION

This application claims priority to German application DE 10 2004 062653, filed Dec. 24, 2004.

FIELD OF THE INVENTION

The invention relates to a composition based on alkoxysilane-functional polyurethane prepolymers suitable for a reactive hot-melt adhesive which is stable to storage at a high temperature.

BACKGROUND OF THE INVENTION

Isocyanate-functional reactive polyurethane adhesives (PU hot-melt adhesives) from prepolymers, which cure irreversibly by the action of moisture from the atmosphere or the materials glued to one another are known (EP-B 455 400). Such prepolymers are specific reaction products of polyester polyols and optionally polyether polyols with polyisocyanates. These reactive PU hot-melt adhesives are universally applicable for joining widely varying materials, such as e.g. plastic, glass, metal, leather or wood.

The setting times of PU hot-melt adhesives, i.e. the solidification times without the reaction of the components with one another starting, can be adjusted in the range from seconds up to minutes by modification of the recipes with components which are crystalline or amorphous at room temperature. In this context, the crystalline structures have the effect not only of a low melt viscosity and a rapid solidification after application, but also of a good low temperature elasticity due to the low glass transition temperature (DE-A 3 827 224, DE-A 4 114 220, EP-A 0 354 527).

In addition, components which are liquid at room temperature can also be used for modification of the properties. Thus, EP-A 0 340 906 describes reactive polyurethane hot-melts comprising a mixture of two polyurethane prepolymers, the first prepolymer being prepared from an amorphous polyol having a glass transition temperature of >20° C. and the second prepolymer being prepared from a polyol which is liquid at room temperature ($T_g$<20° C.).

The actual curing of reactive PU hot-melt adhesives, i.e. crosslinking reaction of the components with one another, takes place within some days by reaction of the isocyanate groups with water to give a thermosetting polyurea. Thereafter, the PU hot-melt adhesives are no longer meltable or e.g. soluble in solvents. Because of this, the cured adhesives have a good heat resistance and resistance to chemicals such as plasticizers, solvents, oils or fuels.

A disadvantage of these adhesives, however, is that because of their preparation process they have a high content of free monomeric polyisocyanates, such as e.g. 4,4'-diisocyanatodiphenylmethane (4,4'-MDI) or 2,4-diisocyanatotoluene or 2,6-diisocyanatotoluene (TDI). These monomeric polyisocyanates have a not inconsiderable vapour pressure at the application temperatures of the adhesives of about 130° C. to about 180° C. This means that the monomeric constituents escape into the environment in gaseous form. Because of these isocyanate emissions, corresponding industrial hygiene measures must be taken, such as e.g. installation of suitable extraction devices.

A further disadvantage of these adhesives is the evolution of carbon dioxide gas in the reaction with water to form a polyurea. As a result, the adhesive may foam in the glued joint and the desired position of the joint components may change.

In order to overcome the abovementioned disadvantages, silane-functional reactive hot-melt adhesives based on polyester polyols are described in the literature.

Thus, EP-A 0 202 491 discloses moisture-curing hot-melt adhesives which are obtainable in a first embodiment by reaction of polyester mixtures having solid polyester contents having glass transition temperatures above 10° C. and liquid polyesters having glass transition temperatures below −10° C. with an excess of polyisocyanates and subsequent reaction of the prepolymers obtained in this way, which contain free NCO groups, with amino- or mercaptosilanes. In a second embodiment, an adduct is first prepared from an amino- or mercaptosilane with a diisocyanate, the two components being reacted in the molar ratio of 1:1. The reaction of this addition product with the polyester mixture then takes place in a second step. The addition of catalysts to accelerate the curing reaction with moisture is not described. Nevertheless, dibutyltin dilaurate (DBTL) is employed as a catalyst for preparation of the hot-melt adhesives in all the embodiment examples. When the reaction has ended, the DBTL is not deactivated, and remains in the product, where in principle it can act as a curing catalyst. The hot-melt adhesives prepared in this way are said to already cure at room temperature with moisture from the atmosphere.

EP-A 0 354 472 describes alkoxysilane-terminated, moisture-crosslinking hot-melt adhesives obtainable by reaction of a) NCO-terminated silane compounds which can be prepared by reaction of amino- or mercaptosilanes with diisocyanates and linear alkylene diols having 2 to 12 carbon atoms and b) linear OH— and/or $NH_2$-terminated difunctional polymers obtainable by reaction of an excess of linear OH— and/or $NH_2$-terminated polyesters, polyethers and/or polyurethanes with diisocyanates. For acceleration of the crosslinking reaction with moisture, the conventional acidic catalysts are mentioned, which are chosen e.g. from the group formed by tin(II) octoate, dibutyltin dilaurate, tetrabutyl titanate, zinc acetate and zinc acetylacetonate or the like.

Nevertheless, the hot-melt adhesives described in the two abovementioned laid-open specifications have acquired no industrial use to date, since because of their significantly reduced reactivity with moisture, compared with isocyanate end groups, the alkoxysilane end groups do not cure or cure only inadequately over a very long period of time without the addition of a catalyst, and therefore build up only inadequate strengths. If the Lewis acids mentioned are added as catalysts, the compositions lose their stability during storage in heat, since the catalysts mentioned also catalyse the transesterification of the polyester units present in the prepolymers with the low molecular weight alcohols, such as e.g. methanol or ethanol, split off from the alkoxy end groups. This leads to an irreversible degradation of the polymer chain and therefore to a destruction of the adhesive. Since the hot-melt adhesives are melted in heating ovens for application and are kept in the liquid state over a relatively long period of time, as a rule at least one working day, however, an adequate stability at high temperatures is necessarily required for industrial use.

The procedure described of preparing an adduct from diisocyanate and aminosilane in a first step represents a considerable industrial disadvantage, since the diadduct of two molecules of aminosilane and diisocyanate will also always form and expensive aminosilane is thus lost.

EP-A 0 480 363 describes a curable composition having at least two hydrolysable silyl groups obtainable by reaction of aliphatic polyesters which contain a hydroxyl and an acryloyl group in the molecule with an isocyanatosilane, subsequent reaction of the reaction product with an aminosilane, and subsequent reaction of the reaction product with a monofunctional isocyanate and/or with a polyisocyanate. Catalysts which are mentioned for curing of the composition are organotin compounds, such as e.g. dibutyltin dilaurate or tin octoate, acid compounds, such as e.g. p-toluenesulfonic acid or phosphoric acid esters, and amines, such as ethylenediamine, isophoronediamine or N,N-dimethyldodecylamine.

The abovementioned compositions are accessible only by an involved multi-stage preparation process and are therefore very expensive. Moreover, the polyesters having a hydroxyl and acryloyl group in the molecule required as the starting substance are not standard products such as are available in diverse forms e.g. for the preparation of reactive PU hot-melts, but are obtainable only with severe limitations. As a result, it is possible to only a limited extent to influence the properties of the hot-melt adhesives in a controlled manner by mixing of amorphous, liquid and crystalline polyesters having appropriate end groups. That which has already been stated above applies in respect of the storage stability in heat when the Lewis acid catalysts mentioned are used.

EP-A 0 096 250 discloses crosslinkable compositions which are liquid at temperatures below 100° C. and are based on polymers containing hydroxyl groups, in which only some of the hydroxyl groups are replaced by alkoxysilyl end groups. Particularly suitable polymers containing hydroxyl groups are, inter alia, polyester polyols. The preparation is carried out in a multi-stage synthesis. In a first embodiment, an adduct is first prepared from an amino- or mercaptosilane with a diisocyanate, the two components being reacted in the molar ratio of 1:1. In a second step, the reaction of this addition product with the polyol mixture in an amount such that the ratio of OH/NCO is less than 1:0.9 takes place. In a second embodiment, the reaction of an OH-containing polymer or a polymer mixture with an excess of diisocyanate takes place in the first step, with subsequent reaction of the prepolymers obtained in this way, which contain free NCO groups, with amino- or mercaptosilanes. In a third step, mixing of the resulting product of stage 2 with OH-containing polymers then takes place. In addition to compounds of tin and titanium, amines are also mentioned as suitable curing catalysts, but in the embodiment examples only DBTL is used. Nevertheless, these compositions are curable not only by access of moisture, but also by application of temperature.

This heat curing is a considerable industrial disadvantage, since the hot-melt adhesives are melted in heating ovens for application and are kept in the liquid state at elevated temperature for a relatively long period of time, as a rule at least one working day. However, these conditions lead to an at least partial crosslinking of the adhesive, as a result of which this becomes unusable. Furthermore, here also an involved multi-stage process for the preparation of the hot-melt adhesive disclosed is necessary. The adducts of aromatic isocyanates, such as e.g. MDI or TDI, and aminosilanes additionally are not stable to storage and must therefore be further reacted directly, which additionally makes the synthesis difficult. However, because of their considerably higher reactivity compared with the aliphatic diisocyanates, such aromatic diisocyanates are preferred for use in hot-melt adhesives.

WO 2004/005420 describes moisture-curing hot-melt adhesives which are prepared from a semicrystalline polyol, a substantially amorphous polyol having either branched primary OH groups or secondary OH groups or mixtures thereof, an aminosilane having secondary amino groups and an isocyanate, and for ecological reasons are substantially tin-free.

A method for the preparation of these moisture-curing hot-melt adhesives is moreover described. In this, in a first step a prepolymer is prepared from a semicrystalline polyol, a substantially amorphous polyol having either branched primary OH groups or secondary OH groups or mixtures thereof and an isocyanate. A tin-free catalyst can optionally be used in this step. 2,2'-Dimorpholinodiethyl ether (DMDEE) is mentioned as an example of a tin-free catalyst. In a second step, the prepolymer is then reacted with an aminosilane having a secondary amino group to give the moisture-curing hot-melt adhesive. In this case the two reaction steps should be carried out without the addition of a tin-containing catalyst. N-Alkyl-aminoalkyl-alkoxysilanes are used as aminosilanes having a secondary amino group. In addition, a catalyst which accelerates the curing with moisture can also be admixed to the finished hot-melt adhesive. Tertiary amines are mentioned by way of example. In the examples explaining the invention, DMDEE is used as a catalyst for the preparation of the prepolymers, i.e. in the reaction of the polyols with the isocyanate. However, no further curing catalyst is admixed to the finished hot-melt adhesive. Since the DMDEE remains in the hot-melt adhesive, however, it of course also acts as a catalyst in the curing with moisture. The examples and comparison example clearly show that if DMDEE is used, glued joints with an adequate final strength can only be achieved if the polyol mixture used for the preparation of the prepolymers comprises polyether polyols having secondary OH groups or amorphous polyesters which have branchings along the main chain. The various comparison examples (e.g. Comparison Example 2) show that with exclusive use of crystalline or unbranched polyester polyols, the DMDEE-catalysed hot-melt adhesives build up only completely inadequate final strengths, with values of ≦approx. 4 MPa after curing for 24 h. These values are significantly lower than the final strengths shown by the products comprising polyether polyols (approx. 9 to 12 MPa after curing for 24 h). The use of polyether polyols having secondary OH groups, however, is not desirable in all cases, since under certain circumstances they adversely influence the adhesive properties.

Sealants based on alkoxysilane-terminated polyether polyols have been known for a long time (EP-A 0 596 360 and WO 00/26271). In addition to organometallic curing catalysts, such as e.g. dibutyltin dilaurate, strongly basic bicyclic tertiary amines are also employed there as catalysts of the prior art. Thus, JP 08283366 describes 1,8-diazabicyclo[5.4.0]-undec-7-ene (DBU) and 1,5-diazabicyclo[4.3.0]non-5-ene (DBN) as particularly suitable. On the other hand, according to this laid-open specification other tertiary amines are not particularly suitable curing catalysts, since only extremely long curing times can be achieved with them. In particular, the compound bis-(N,N'-dimethylaminoethyl) ether (catalyst A-1) is mentioned as a negative comparison example and this catalyst is described as unsuitable for accelerating the curing reaction of the alkoxysilane-terminated polyurethane prepolymers with moisture.

Nevertheless, strongly basic bicyclic tertiary amines, such as 1,8-diazabicyclo[5.4.0]-undec-7-ene (DBU) and 1,5-diazabicyclo[4.3.0]non-5-ene (DBN) cannot be used as curing catalysts in the case of alkoxy-terminated hot-melt adhesives based on polyester polyols, since they lead to an irreversible degradation of the polyester units of the adhesive, and therefore to destruction thereof, under the action of heat, e.g. during the melting operation.

It can be seen from the prior art that there continues to be a need for polyester-based alkoxysilane-functional hot-melt adhesives which are stable to storage and cure very rapidly with moisture, and which have high strengths after complete curing with moisture.

SUMMARY OF THE INVENTION

The object of the present invention was therefore to provide moisture-curing alkoxysilane-functional hot-melt adhesives which are easy to prepare, have a good storage stability when stored in heat and nevertheless cure very rapidly on access of moisture and lead to high strengths after curing.

It has been possible to achieve this object by providing the compositions and hot-melt adhesives which contain alkoxysilane end groups and are described in more detail in the following.

In fact, it has been found, surprisingly, that polyester-based compositions and hot-melt adhesives which contain alkoxysilane end groups and comprise the catalyst bis-(N,N'-dimethylaminoethyl) ether (catalyst A-1) have an excellent storage stability, cure very rapidly with moisture and furthermore give glued joints having very high final strengths.

The invention thus provides moisture-curing alkoxysilane-functional compositions which are suitable for hot-melt adhesives and are obtainable by reaction of A) polyurethane prepolymers obtainable by reaction of
  i) at least one aromatic, aliphatic, araliphatic and/or cycloaliphatic diisocyanate, preferably having a content of free NCO groups of 5 to 60 wt. %
  with
  ii) a polyol component comprising at least one linear polyester polyol which is solid at room temperature and preferably at least crystalline, and optionally additionally one or more amorphous linear polyester polyols and/or one or more linear polyester polyols which are liquid at room temperature and optionally one or more linear polyether polyols
  wherein the ratio of i) to ii) is chosen such that the molar ratio of NCO to OH is from 1.2 to 4.0, preferably from 1.3 to 3.0
with
B) compounds containing alkoxysilane and amino or mercapto groups, of the general formula (I)

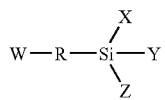

in which
X, Y and Z represent identical or different straight-chain or branched ($C_1$-$C_8$)alkyl radicals or cyclic ($C_3$-$C_8$)alkyl radicals or ($C_1$-$C_8$)alkoxy radicals, with the proviso that at least one of the radicals is a ($C_1$-$C_8$)alkoxy radical,
R represents straight-chain or branched alkylene radicals having 1 to 8 carbon atoms, preferably 1 to 4 carbon atoms, or cyclic alkylene radicals having 3 to 8 carbon atoms,
W represents either —SH or —NH—R'
  wherein
  R' represents hydrogen, straight-chain or branched alkyl radicals having 1 to 8 carbon atoms, preferably 1 to 4 carbon atoms, or cyclic alkyl radicals having 3 to 8 carbon atoms or aryl radicals or radicals of the general formula (II)

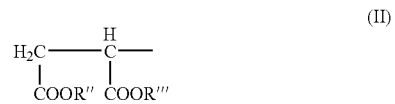

wherein
R'' and R''' represent identical or different straight-chain or branched alkyl radicals having 1 to 8 carbon atoms, preferably 1 to 4 carbon atoms, or cyclic alkyl radicals having 3 to 8 carbon atoms
wherein
in formula (I), X, Y and Z preferably independently of one another represent methoxy or ethoxy, W preferably represents —NH—R' and R' preferably represents a radical of the general formula (II)
wherein the ratio of amounts of A) to B) is chosen such that 0.95 to 1.1 mol of amine or mercapto groups from B) are employed per mol of NCO groups from A), and addition of C) bis-(N,N'-dimethylaminoethyl) ether (catalyst A-1) for catalysis of the crosslinking reaction of the alkoxysilane end group on access of moisture from the environment or from the substrates glued to one another (curing catalyst).

The invention also provides hot-melt adhesives which comprise the compositions according to the invention and the use of the compositions according to the invention as adhesives, in particular hot-melt adhesives, or for the preparation thereof.

The invention also provides substrates glued using the compositions and hot-melt adhesives according to the invention.

DETAILED DESRIPTION OF PREFERRED EMBODIMENTS

As used herein, as used in the examples or unless otherwise expressly specified, all numbers may be read as if prefaced by the word "about", even if the term does not expressly appear. Also, any numerical range recited herein is intended to include all sub-ranges subsumed therein.

The expression "room temperature" used here and in the following is intended to designate a temperature of 25° C.

The isocyanate prepolymers A) to be employed according to the invention are prepared in the manner known per se from polyurethane chemistry, for example by reaction of a diisocyanate component i) having free NCO groups, which is described in more detail below, with a polyol component ii), which is characterized in more detail below.

Diisocyanates which are suitable as the diisocyanate component i) are, for example, those having isocyanate contents of 5 to 60 wt. % (based on the diisocyanate) and having aliphatically, cycloaliphatically, araliphatically and/or aromatically bonded isocyanate groups, such as e.g. 1,4-diisocyanatobutane, 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis-(isocyanatomethyl)-cyclohexane, 1-isocyanato-3,3,5-trimethyl-5-isocyanatomethylcyclohexane (isophoronediisocyanate, IPDI), 4,4'-diisocyanatodicyclohexylmethane, 1-isocyanato-1-methyl-4(3)-isocyanatomethylcyclohexane, bis-(isocyanatomethyl)-norbornane, 1,3- and 1,4-bis-(2-isocyanato-prop-2-yl)-benzene (TMXDI), 2,4- and/or 2,6-diisocyanatotoluene (TDI), 2,2'-, 2,4'- and/or 4,4'-diisocyanato-diphenylmethane (MDI), 1,5-diisocyanatonaphthalene and 1,3- and 1,4-bis-(isocyanatomethyl)-benzene.

Diisocyanates which are preferred as the diisocyanate i) are 1,6-diisocyanatohexane (HDI), 1-isocyanato-3,3,5-trimethyl-5-isocyanatomethylcyclohexane (isophorone-diisocyanate, IPDI), 4,4'-diisocyanatodicyclohexylmethane, 2,4- and/or 2,6-diisocyanatotoluene (TDI) and 2,2'-, 2,4'- and/or 4,4'-diisocyanatodiphenylmethane (MDI).

For preparation of the polyurethane prepolymers A), the diisocyanate component i) is reacted with a polyol component ii) such that the molar ratio of NCO groups to OH groups is from 1.2 to 4.0, preferably from 1.3 to 3.0.

In the context of the present invention, a polyester polyol as the polyol component ii) is understood as meaning a polyester having more than one OH group, preferably two terminal OH groups. Such polyesters are known to the person skilled in the art. They can be prepared by a known route, for example from aliphatic hydroxycarboxylic acids or from aliphatic and/or aromatic dicarboxylic acids and one or more diols. Corresponding derivatives can also be employed as starting materials, such as e.g. lactones, esters of lower alcohols or anhydrides. Examples of suitable starting substances are succinic acid, adipic acid, suberic cid, azelaic aid, sebacic acid, dodecanedioic acid, glutaric acid, glutaric anhydride, phthalic acid, isophthalic acid, terephthalic acid, phthalic anhydride, ethylene glycol, diethylene glycol, 1,4-butanediol, 1,6-hexanediol, neopentylglycol and E-caprolactone.

Suitable partly crystalline, amorphous and liquid polyester polyols have molecular weights of from 500 g/mol to 10,000 g/mol. The polyester polyols preferably have molecular weight of from 1,000 g/mol to 8,000 g/mol, and the polyester polyols particularly preferably have molecular weights of from 1,500 g/mol and 6,500 g/mol.

Polyester polyols are either liquid (glass transition temperature Tg<20° C.) or solid at room temperature. In this context, polyester polyols which are solid at room temperature are either amorphous (glass transition temperature Tg>20° C.) or at least partly crystalline.

The moisture-curing alkoxysilane-functional compositions and hot-melt adhesives according to the invention comprise in their polyol component ii) at least one polyester polyol which is at least bifunctional and is solid at room temperature and preferably at least partly crystalline.

They optionally furthermore comprise in their polyol component ii) one or more at least bifunctional and at least partly crystalline polyester polyols and/or one or more at least bifunctional amorphous polyester polyols and/or one or more at least bifunctional polyester polyols which are liquid at room temperature and optionally one or more at least bifunctional polyether polyols.

"At least partly crystalline" is to be understood as meaning that the polyester polyols are not completely crystalline, but also additionally have a certain amorphous content. They crystallize and have a crystalline melting point (Tm) and a glass transition temperature (Tg). The melting point indicates the temperature at which the crystalline contents of the material melt. It can be determined, for example, as the main endothermic peak (crystalline melting peak) by differential thermoanalysis by means of a DSC measurement. The melting point of the at least partly crystalline polyester polyols is, for example, in the range from about 35° C. to about 120° C., determined by means of DSC during the second heating up with a heating and cooling rate of 10 K/min. The glass transition temperature of the at least partly crystalline polyester polyols is in general, for example, down to far below room temperature. Suitable partly crystalline polyester polyols are known to the person skilled in the art.

Suitable at least partly crystalline, i.e. crystallizing, polyester polyols are, for example, those based on linear aliphatic dicarboxylic acids having 6 to 12 carbon atoms in the molecule, such as e.g. adipic acid, azelaic acid, sebacic acid and dodecandioic acid, preferably adipic acid and dodecandioic acid, and linear diols having 4 to 8 carbon atoms in the molecule, preferably having an even number of carbon atoms, such as, for example, 1,4-butanediol and 1,6-hexanediol. The polycaprolactone derivatives based on bifunctional starter molecules, such as, for example, 1,6-hexanediol, are likewise to be mentioned as particularly suitable.

Suitable amorphous polyester polyols are, for example, those based on adipic acid, isophthalic acid, terephthalic acid, ethylene glycol, neopentylglycol and 3-hydroxy-2,2-dimethylpropyl 3-hydroxy-2,2-dimethylpropanoate.

Suitable polyester polyols which are liquid at room temperature are, for example, those based on adipic acid, ethylene glycol, 1,6-hexanediol and neopentylglycol.

The conventional polyethers in polyurethane chemistry are suitable as a polyether polyol, such as, for example, the addition or mixed addition compounds of tetrahydrofuran, styrene oxide, ethylene oxide, propylene oxide, the butylene oxides or epichlorohydrin, preferably of ethylene oxide and/or propylene oxide, which are prepared using di- to hexafunctional starter molecules, such as, for example, water, ethylene glycol, 1,2- or 1,3-propylene glycol, bisphenol A, neopentylglycol, glycerol, trimethylolpropane, pentaerythritol, sorbitol or amines containing 1 to 4 NH bonds. The bifunctional propylene oxide and/or ethylene oxide adducts and polytetrahydrofuran are to be mentioned as preferred. Such polyether polyols and their preparation are known to the person skilled in the art.

The suitable polyether polyols have molecular weights of from 300 g/mol to 20,000 g/mol. The polyether polyols preferably have molecular weights of from 500 g/mol to 15,000 g/mol, and particularly preferably from 500 g/mol to 10,000 g/mol.

One or more different polyester polyols of an at least partly crystalline or amorphous as well as liquid nature can be employed in the compositions according to the invention. The quantitative composition of the polyol can be determined by the person skilled in the art according to the desired profile of properties, and is not subject to specific limits. The at least partly crystalline solid polyester polyol and solid amorphous polyester polyol can be present in an amount of up to 100 wt. %, in each case based on the total weight of the polyol component. Preferably, the content of polyester polyol which is solid at room temperature and at least partly crystalline is 10 to 100 wt. %, the content of solid amorphous polyester polyol is, for example, 0 to 70 wt. % and the content of polyester polyol which is liquid at room temperature is, for example, 0 to 70 wt. %, in each case based on the total weight of the polyol component. The content of polyether polyol can be, for example, 0 to 50 wt. %, based on the total weight of the polyol component.

The polyurethane prepolymers A) are prepared, for example, in a manner such that, when polyols which are liquid at the reactions temperatures are employed, these are mixed with an excess of the polyisocyanates and the homogeneous mixture is stirred until a constant NCO value is obtained, which is usually achieved after 30 minutes to two hours. 80° C. to 150° C., preferably 100° C. to 130° C., is chosen as the reaction temperature. The preparation of the polyurethane prepolymers A) can of course also be carried out continuously in a cascade of stirred tanks or in suitable mixing units, such as, for example, high-speed mixers in accordance with the rotor-stator principle.

It is of course also possible to modify the polyester polyols and/or polyether polyols or a portion thereof with a deficit of diisocyanates, preferably 1,6-diisocyanatohexane (HDI), 2,4- and/or 2,6-diisocyanatotoluene (TDI) and/or 2,4'- and/or 4,4'-diisocyanatodiphenylmethane (MDI) and, when the reaction has ended, to react the polyols containing urethane groups with an excess of diisocyanates to give the polyurethane prepolymer A).

It is likewise possible to carry out the reaction of the polyols with the diisocyanates in the presence of up to 5 wt. % of, for example, trimers of aliphatic diisocyanates, such as, for example, hexamethylene-diisocyanate, or to add such trimers when the prepolymerization has ended.

In the second stage of the process according to the invention, the polyurethane prepolymers A) which can be employed according to the invention are reacted with the compounds B) of the formula (I) defined above.

Examples of suitable compounds B) of the general formula (I) are gamma-aminopropyltrimethoxysilane, gamma-aminopropyltriethoxysilane, N-butyl-gamma-aminopropyltrimethoxysilane, N-propyl-gamma-aminopropyltrimethoxysilane, N-phenyl-gamma-aminopropyltrimethoxysilane, 4-amino-3,3-dimethyl-butyl-trimethoxysilane, 4-amino-3,3-dimethyl-butyl-methyldimethoxysilane, gamma-mercaptopropyltrimethoxysilane and gamma-mercaptopropyltriethoxysilane.

Preferably, a compound B) of the general formula (I) which contains alkoxysilane and amino groups, i.e. the radical W of which corresponds to an —NH—R' group, wherein the radical R' preferably corresponds to the general formula (II), is employed. The preparation of such a compound is carried out as described, for example, in EP-A 0 596 360.

Concrete examples which may be mentioned for such preferred compounds B) are N-(3-triethoxysilylpropyl)aspartic acid diethyl ester, N-(3-triethoxysilylpropyl)aspartic acid dimethyl ester, N-(3-triethoxysilylpropyl)aspartic acid di-n-butyl ester, N-(3-trimethoxysilylpropyl)aspartic acid dimethyl ester and N-(3-trimethoxysilylpropyl)aspartic acid diethyl ester.

The reaction of the NCO prepolymers with the compounds of the formula (I) containing alkoxysilane and amino or mercapto groups in the process according to the invention is carried out, for example, within a temperature range of from 80° C. to 150° C., preferably 100° C. to 130° C., the ratios of amount as a rule being chosen such that 0.95 to 1.1 mol of amino- or mercaptosilane compound are employed per mol of NCO groups employed. Preferably, 1 mol of amino- or mercaptosilane compound is employed per mol of NCO groups employed.

If aspartates are used as compounds of the formula (I) containing alkoxysilane and amino groups, if relatively high reaction temperatures are used, according to the teaching of EP-A 0 807 649, a cyclocondensation reaction may occur, but this is in no way troublesome and sometimes can even be advantageous.

Bis-(N,N'-dimethylaminoethyl) ether (catalyst A-1) is added, as a catalyst for the curing reaction of the hot-melt adhesives according to the invention with moisture from the environment or from the substrates glued to one another, to the polyurethane prepolymers which contain alkoxysilane end groups and can be employed according to the invention. The addition can take place as the next process step after the preparation of the polyurethane prepolymers containing alkoxysilane end groups. The bis-(N,N'-dimethylaminoethyl) ether (catalyst A-1) acting as a catalyst can optionally also already be added at an earlier point in time, e.g. during the preparation of the prepolymers A), although this is not preferred.

The catalyst is employed, for example, in an amount of 0.1 wt. % to 1.5 wt. %, based on the polyurethane prepolymer containing alkoxysilane end groups. The catalyst is preferably employed in an amount of 0.2 wt. % to 1.0 wt. %, based on the polyurethane prepolymer containing alkoxysilane end groups.

The catalyst is particularly preferably employed in an amount of 0.25 wt. % to 0.8 wt. %, based on the polyurethane prepolymer containing alkoxysilane end groups.

The alkoxysilane-functional hot-melt adhesives according to the invention can additionally comprise one or more conventional additives for hot-melt adhesives. For example, they can be modified in the conventional manner with inorganic or organic fillers, dyestuffs, resins and/or extender oils.

Desiccants can furthermore be added to the alkoxysilane-functional hot-melt adhesives according to the invention, and examples which may be mentioned are, in particular, alkoxysilyl compounds, such as vinyltrimethoxysilane, methyltrimethoxysilane, i-butyltrimethoxysilane and hexadecyltrimethoxysilane.

In addition, the known functional silanes can be added as adhesion promoters to the alkoxysilane-functional hot-melt adhesives according to the invention, such as, for example, aminosilanes of the abovementioned type, and also N-aminoethyl-3-aminopropyl-trimethoxy- and/or N-aminoethyl-3-aminopropyl-methyl-dimethoxysilane, epoxysilanes and/or mercaptosilanes.

The compositions according to the invention can be employed in diverse ways as adhesives, for example as a structural adhesive for provisional fixing of structural components, as a bookbinding adhesive or adhesives for the production of cross bottom valve sacks, composite films or laminates or as an edge strip and as adhesives in the automobile industry for gluing metal sheets to one another or e.g. to glass and plastics.

The invention therefore also provides the use of the moisture-reactive, alkoxysilane-functional polyurethane prepolymers according to the invention as adhesives. The invention also provides substrates which have been glued using the compositions or adhesives according to the invention.

The moisture-curing, alkoxysilane-functional polyurethane hot-melt adhesives are processed in a manner known to the person skilled in the art. They are preferably applied at elevated temperature, the reactive hot-melt adhesives being melted continuously or discontinuously e.g. at temperatures of from 80° C. to 180° C. and the melt being brought into contact with the substrates to be glued e.g. by spray or roller application. In this context, the moisture-curing, alkoxysilane-functional polyurethane hot-melt adhesive is applied to at least one surface of the substrates to be glued. The components to be glued can then be brought together under pressure immediately.

EXAMPLES

Polyester A (Polyester Polyol which is Solid at Room Temperature and at Least Partly Crystalline):

Polyester polyol based on adipic acid and 1,6-hexanediol having a hydroxyl number of about 30 mg KOH/g and an acid number of about 0.5 mg KOH/g. The preparation is carried out in a manner known to the person skilled in the art and is described e.g. in Ullmanns Enzyklopädie der technischen Chemie, "Polyester", 4th edition, Verlag Chemie, Weinheim, 1980.

Polyester B (Polyester Polyol which is Solid at Room Temperature and at Least Partly Crystalline):

Polyester polyol based on dodecanedioic acid and 1,6-hexanediol having a hydroxyl number of about 30 mg KOH/g and an acid number of about 0.8 mg KOH/g. The preparation is carried out in a manner known to the person skilled in the art and is described e.g. in Ullmanns Enzyklopädie der technischen Chemie, "Polyester", 4th edition, Verlag Chemie, Weinheim, 1980.

Polyester C (Polyester Polyol which is Solid at Room Temperature and Amorphous):

| Polyester polyol having the following composition | |
|---|---|
| | Weight content in the polyester in % |
| Ethylene glycol | approx. 15.3 |
| Neopentylglycol | approx. 10.3 |
| 3-Hydroxy-2,2-dimethylpropyl 3-hydroxy-2,2-dimethylpropanoate | approx. 21.0 |
| Adipic acid | approx. 6.0 |
| Isophthalic acid | approx. 20.7 |
| Terephthalic acid | approx. 26.7 | and a hydroxyl number of about 34.7 mg KOH/g and an acid number of about 1.2 mg KOH/g. The preparation is carried out in a manner known to the person skilled in the art and is described e.g. in Ullmanns Enzyklopädie der technischen Chemie, "Polyester", 4th edition, Verlag Chemie, Weinheim, 1980.

Polyester D (Polyester Polyol which is Liquid at Room Temperature):

| Polyester polyol having the following composition | |
|---|---|
| | Weight content in the polyester in % |
| Ethylene glycol | approx. 17.0 |
| 1,6-Hexanediol | approx. 19.5 |
| Neopentylglycol | approx. 8.1 |
| Adipic acid | approx. 55.4 | and a hydroxyl number of about 22 mg KOH/g and an acid number of about 1.5 mg KOH/g. The preparation is carried out in a manner known to the person skilled in the art and is described e.g. in Ullmanns Enzyklopädie der technischen Chemie, "Polyester", 4th edition, Verlag Chemie, Weinheim, 1980.

Polyether E:

Polypropylene oxide having a hydroxyl number of about 56 mg KOH/g.

The polyether is prepared by KOH catalysis in a generally known manner, e.g. by the method of L. E. St. Pierre, Polyethers Part I, Polyalkylene Oxide and other Polyethers, editor: Norman G. Gaylord; High Polymers vol. XIII; Interscience Publishers; Newark 1963; p. 130 et seq.

Catalyst A-1:

Bis-(N,N'-dimethylaminoethyl) ether, obtainable e.g. from Huntsman Belgium BVBA, Everberg under the name JEFFCAT® ZF-20.

DMDEE:

2,2'-Dimorpholinodiethyl ether, obtainable e.g. from Air Products Nederland B.V., Utrecht under the name DABCO® DMDEE.

DBTL:

Dibutyltin dilaurate, obtainable e.g. from OSi Specialties under the name Fomrez® SUL-4.

DBU:

1,8-Diazabicyclo[5.4.0]-undec-7-ene, obtainable from Merck KGaA, Darmstadt.

DBN:

1,5-Diazabicyclo[4.3.0]non-5-ene, obtainable from Merck KGaA, Darmstadt.

Example 1 (According to the Invention)

790.34 g (0.219 mol) polyester A are initially introduced into a 2 l beaker with a ground seal, melted at 130° C. and then dewatered for 1 h at 130° C. under a reduced pressure of 30 mbar (+/−10 mbar). 109.5 g (0.438 mol) 4,4'-diisocyanato-diphenylmethane (Desmodur® 44 M, Bayer AG, Leverkusen) are then added. After a stirring-in time of 30 min, an NCO content of 1.99% is determined (theory: 2.04%). The amount equivalent to the NCO content, 148.46 g (0.422 mol), of N-(3-trimethoxysilylpropyl)aspartic acid diethyl ester (prepared in accordance with EP-A 596 360, Example 5) is now slowly added dropwise into the apparatus, which is flushed with nitrogen, such that as far as possible the temperature does not rise by more than 10° C. When the total amount of N-(3-trimethoxysilylpropyl)aspartic acid diethyl ester has been added dropwise, the mixture is subsequently stirred further at 130° C. for approx. half an hour. Thereafter, 0.5 wt. % catalyst A-1 is added as a curing catalyst. The batch is homogenized thoroughly and then filled into aluminium cartridges with a filling weight of approx. 150 g in each case, and these are closed air-tight. In each case one of these cartridges is stored at 100° C. in a circulating air drying cabinet for 4 h, 24 h, 48 h and 72 h. The viscosity after storage in heat is determined on these samples. The remaining cartridges are conditioned at 100° C. in a circulating air drying cabinet for 4 h. The remaining tests are carried out on these samples.

Example 2 (According to the Invention)

790.34 g (0.219 mol) polyester A are initially introduced into a 2 l beaker with a ground seal, melted at 130° C. and then dewatered for 1 h at 130° C. under a reduced pressure of 30 mbar (+/−10 mbar). 109.5 g (0.438 mol) 4,4'-diisocyanato-diphenylmethane (Desmodur® 44 M, Bayer AG, Leverkusen) are then added. After a stirring-in time of 30 min, an NCO content of 2.00% is determined (theory: 2.04%). The amount equivalent to the NCO content, 76.28 g (0.425 mol), of 3-(trimethoxysilyl)-propylamine (Merck KGaA, Darmstadt) is now slowly added dropwise into the apparatus, which is flushed with nitrogen, such that as far as possible the temperature does not rise by more than 10° C. When the total amount of 3-(trimethoxysilyl)-propylamine has been added dropwise, the mixture is subsequently stirred further at 130° C. for approx. half an hour. Thereafter, 0.5 wt. % catalyst A-1 is added as a curing catalyst. The batch is homogenized thoroughly and then filled into aluminium cartridges with a filling weight of approx. 150 g in each case, and these are closed air-tight. In each case one of these cartridges is stored at 100° C. in a circulating air drying cabinet for 4 h, 24 h, 48 h and 72 h. The viscosity after storage in heat is determined on these samples. The remaining cartridges are conditioned at 100° C.

in a circulating air drying cabinet for 4 h. The remaining tests are carried out on these samples.

Example 3 (According to the Invention)

738.78 g (0.191 mol) polyester A and 316.62 g (0.098 mol) polyester C are initially introduced into a 2 l beaker with a ground seal, melted at 130° C. and then dewatered for 1 h at 130° C. under a reduced pressure of 30 mbar (+/−10 mbar). 144.6 g (0.578 mol) 4,4'-diisocyanatodiphenylmethane (Desmodur® 44 M, Bayer AG, Leverkusen) are then added. After a stirring-in time of 30 min, an NCO content of 1.95% is determined (theory: 2.02%). The amount equivalent to the NCO content, 145.38 g (0.414 mol), of N-(3-trimethoxysilylpropyl)aspartic acid diethyl ester (prepared in accordance with EP-A 0 596 360, Example 5) is now slowly added dropwise into the apparatus, which is flushed with nitrogen, such that as far as possible the temperature does not rise by more than 10° C. When the total amount of N-(3-trimethoxysilylpropyl)aspartic acid diethyl ester has been added dropwise, the mixture is subsequently stirred further at 130° C. for approx. half an hour. Thereafter, 0.5 wt. % catalyst A-1 is added as a curing catalyst. The batch is homogenized thoroughly and then filled into aluminium cartridges with a filling weight of approx. 150 g in each case, and these are closed air-tight. The cartridges are conditioned at 100° C. in a circulating air drying cabinet for 4 h.

Example 4 (According to the Invention)

425.67 g (0.110 mol) polyester A, 319.25 g (0.099 mol) polyester C and 319.25 g (0.063 mol) polyester D are initially introduced into a 2 l beaker with a ground seal, melted at 130° C. and then dewatered for 1 h at 130° C. under a reduced pressure of 30 mbar (+/−10 mbar). 135.83 g (0.543 mol) 4,4'-diisocyanatodiphenylmethane (Desmodur® 44 M, Bayer AG, Leverkusen) are then added. After a stirring-in time of 30 min, an NCO content of 1.90% is determined (theory: 1.90%). The amount equivalent to the NCO content, 141.12 g (0.402 mol), of N-(3-trimethoxysilylpropyl)aspartic acid diethyl ester (prepared in accordance with EP-A 596 360, Example 5) is now slowly added dropwise into the apparatus, which is flushed with nitrogen, such that as far as possible the temperature does not rise by more than 10° C. When the total amount of N-(3-trimethoxysilylpropyl)aspartic acid diethyl ester has been added dropwise, the mixture is subsequently stirred further at 130° C. for approx. half an hour. Thereafter, 0.5 wt. % catalyst A-1 is added as a curing catalyst. The batch is homogenized thoroughly and then filled into aluminium cartridges with a filling weight of approx. 150 g in each case, and these are closed air-tight. The cartridges are conditioned at 100° C. in a circulating air drying cabinet for 4 h.

Example 5 (According to the Invention)

831.82 g (0.215 mol) polyester A and 207.95 g (0.105 mol) polyether E are initially introduced into a 2 l beaker with a ground seal, melted at 130° C. and then dewatered for 1 h at 130° C. under a reduced pressure of 30 mbar (+/−10 mbar). 160.23 g (0.640 mol) 4,4'-diisocyanatodiphenylmethane (Desmodur® 44 M, Bayer AG, Leverkusen) are then added. After a stirring-in time of 30 min, an NCO content of 2.26% is determined (theory: 2.24%). The amount equivalent to the NCO content, 168.77 g (0.480 mol), of N-(3-trimethoxysilylpropyl)aspartic acid diethyl ester (prepared in accordance with EP-A 0 596 360, Example 5) is now slowly added dropwise into the apparatus, which is flushed with nitrogen, such that as far as possible the temperature does not rise by more than 10° C. When the total amount of N-(3-trimethoxysilylpropyl)aspartic acid diethyl ester has been added dropwise, the mixture is subsequently stirred further at 130° C. for approx. half an hour. Thereafter, 0.5 wt. % catalyst A-1 is added as a curing catalyst. The batch is homogenized thoroughly and then filled into aluminium cartridges with a filling weight of approx. 150 g in each case, and these are closed air-tight. The cartridges are conditioned at 100° C. in a circulating air drying cabinet for 4 h.

Example 6 (According to the Invention)

422.76 g (0.109 mol) polyester A, 317.07 g (0.098 mol) polyester C and 317.07 g (0.079 mol) polyester B are initially introduced into a 2 l beaker with a ground seal, melted at 130° C. and then dewatered for 1 h at 130° C. under a reduced pressure of 30 mbar (+/−10 mbar). 143.11 g (0.572 mol) 4,4'-diisocyanatodiphenylmethane (Desmodur® 44 M, Bayer AG, Leverkusen) are then added. After a stirring-in time of 30 min, an NCO content of 2.02% is determined (theory: 2.00%). The amount equivalent to the NCO content, 149.32 g (0.425 mol), of N-(3-trimethoxysilylpropyl)aspartic acid diethyl ester (prepared in accordance with EP-A 0 596 360, Example 5) is now slowly added dropwise into the apparatus, which is flushed with nitrogen, such that as far as possible the temperature does not rise by more than 10° C. When the total amount of N-(3-trimethoxysilylpropyl)aspartic acid diethyl ester has been added dropwise, the mixture is subsequently stirred further at 130° C. for approx. half an hour. Thereafter, 0.5 wt. % catalyst A-1 is added as a curing catalyst. The batch is homogenized thoroughly and then filled into aluminium cartridges with a filling weight of approx. 150 g in each case, and these are closed air-tight. The cartridges are conditioned at 100° C. in a circulating air drying cabinet for 4 h.

Comparison Example 1 (not According to the Invention)

790.34 g (0.219 mol) polyester A are initially introduced into a 2 l beaker with a ground seal, melted at 130° C. and then dewatered for 1 h at 130° C. under a reduced pressure of 30 mbar (+/−10 mbar). 109.5 g (0.438 mol) 4,4'diisocyanatodiphenylmethane (Desmodur® 44 M, Bayer AG, Leverkusen) are then added. After a stirring-in time of 30 min, an NCO content of 1.98% is determined (theory: 2.04%). The amount equivalent to the NCO content, 147.27 g (0.419 mol), of N-(3-trimethoxysilylpropyl)aspartic acid diethyl ester (prepared in accordance with EP-A 0 596 360, Example 5) is now slowly added dropwise into the apparatus, which is flushed with nitrogen, such that as far as possible the temperature does not rise by more than 10° C. When the total amount of N-(3-trimethoxysilylpropyl)aspartic acid diethyl ester has been added dropwise, the mixture is subsequently stirred further at 130° C. for approx. half an hour. Thereafter, the batch is filled into aluminium cartridges with a filling weight of approx. 150 g in each case, and these are closed air-tight. In each case one of these cartridges is stored at 100° C. in a circulating air drying cabinet for 4 h, 24 h, 48 h and 72 h. The viscosity after storage in heat is determined on these samples. The remaining cartridges are conditioned at 100° C.

in a circulating air drying cabinet for 4 h. The remaining tests are carried out on these samples.

Comparison Example 2 (According to the Invention)

790.34 g (0.219 mol) polyester A are initially introduced into a 2 l beaker with a ground seal, melted at 130° C. and then dewatered for 1 h at 130° C. under a reduced pressure of 30 mbar (+/−10 mbar). 109.5 g (0.438 mol) 4,4'-diisocyanato-diphenylmethane (Desmodur® 44 M, Bayer AG, Leverkusen) are then added. After a stirring-in time of 30 min, an NCO content of 1.99% is determined (theory: 2.04%). The amount equivalent to the NCO content, 75.67 g (0.422 mol), of 3-(trimethoxysilyl)-propylamine (Merck KGaA, Darmstadt) is now slowly added dropwise into the apparatus, which is flushed with nitrogen, such that as far as possible the temperature does not rise by more than 10° C. When the total amount of 3-(trimethoxysilyl)-propylamine has been added dropwise, the mixture is subsequently stirred further at 130° C. for approx. half an hour. Thereafter, the batch is filled into aluminium cartridges with a filling weight of approx. 150 g in each case, and these are closed air-tight. In each case one of these cartridges is stored at 100° C. in a circulating air drying cabinet for 4 h, 24 h, 48 h and 72 h. The viscosity after storage in heat is determined on these samples. The remaining cartridges are conditioned at 100° C. in a circulating air drying cabinet for 4 h. The remaining tests are carried out on these samples.

Comparison Example 3 (not According to the Invention)

1,062.53 g (0.275 mol) polyester A are initially introduced into a 2 l beaker with a ground seal, melted at 130° C. and then dewatered for 1 h at 130° C. under a reduced pressure of 30 mbar (+/−10 mbar). 137.47 g (0.549 mol) 4,4'-diisocyanato-diphenylmethane (Desmodur® 44 M, Bayer AG, Leverkusen) are then added. After a stirring-in time of 30 min, an NCO content of 1.86% is determined (theory: 1.92%). The amount equivalent to the NCO content, 138.89 g (0.395 mol), of N-(3-trimethoxysilylpropyl)aspartic acid diethyl ester (prepared in accordance with EP-A 0 596 360, Example 5) is now slowly added dropwise into the apparatus, which is flushed with nitrogen, such that as far as possible the temperature does not rise by more than 10° C. When the total amount of N-(3-trimethoxysilylpropyl)aspartic acid diethyl ester has been added dropwise, the mixture is subsequently stirred further at 130° C. for approx. half an hour. Thereafter, 0.5 wt. % DBTL is added as a curing catalyst. The batch is homogenized thoroughly and then filled into aluminium cartridges with a filling weight of approx. 150 g in each case, and these are closed air-tight. In each case one of these cartridges is stored at 100° C. in a circulating air drying cabinet for 4 h, 24 h, 48 h and 72 h. The viscosity after storage in heat is determined on these samples. The remaining cartridges are conditioned at 100° C. in a circulating air drying cabinet for 4 h. The remaining tests are carried out on these samples.

Comparison Example 4 (not According to the Invention)

790.34 g (0.219 mol) polyester A are initially introduced into a 2 l beaker with a ground seal, melted at 130° C. and then dewatered for 1 h at 130° C. under a reduced pressure of 30 mbar (+/−10 mbar). 109.5 g (0.438 mol) 4,4'-diisocyanato-diphenylmethane (Desmodur® 44 M, Bayer AG, Leverkusen) are then added. After a stirring-in time of 30 min, an NCO content of 1.91% is determined (theory: 2.04%). The amount equivalent to the NCO content, 142.46 g (0.406 mol), of N-(3-trimethoxysilylpropyl)aspartic acid diethyl ester (prepared in accordance with EP-A 0 596 360, Example 5) is now slowly added dropwise into the apparatus, which is flushed with nitrogen, such that as far as possible the temperature does not rise by more than 10° C. When the total amount of N-(3-trimethoxysilylpropyl)aspartic acid diethyl ester has been added dropwise, the mixture is subsequently stirred further at 130° C. for approx. half an hour. Thereafter, 0.5 wt. % DBU (50% in ethyl acetate) is added as a curing catalyst. The batch is homogenized thoroughly and then filled into aluminium cartridges with a filling weight of approx. 150 g in each case, and these are closed air-tight. In each case one of these cartridges is stored at 100° C. in a circulating air drying cabinet for 4 h, 24 h, 48 h and 72 h. The viscosity after storage in heat is determined on these samples. The remaining cartridges are conditioned at 100° C. in a circulating air drying cabinet for 4 h. The remaining tests are carried out on these samples.

Comparison Example 5 (not According to the Invention)

790.34 g (0.219 mol) polyester A are initially introduced into a 2 l beaker with a ground seal, melted at 130° C. and then dewatered for 1 h at 130° C. under a reduced pressure of 30 mbar (+/−10 mbar). 109.5 g (0.438 mol) 4,4'-diisocyanato-diphenylmethane (Desmodur® 44 M, Bayer AG, Leverkusen) are then added. After a stirring-in time of 30 min, an NCO content of 1.99% is determined (theory: 2.04%). The amount equivalent to the NCO content, 148.46 g (0.422 mol), of N-(3-trimethoxysilylpropyl)aspartic acid diethyl ester (prepared in accordance with EP-A 0 596 360, Example 5) is now slowly added dropwise into the apparatus, which is flushed with nitrogen, such that as far as possible the temperature does not rise by more than 10° C. When the total amount of N-(3-trimethoxysilylpropyl)aspartic acid diethyl ester has been added dropwise, the mixture is subsequently stirred further at 130° C. for approx. half an hour. Thereafter, 0.5 wt. % DBN is added as a curing catalyst. The batch is homogenized thoroughly and then filled into aluminium cartridges with a filling weight of approx. 150 g in each case, and these are closed air-tight. In each case one of these cartridges is stored at 100° C. in a circulating air drying cabinet for 4 h, 24 h, 48 h and 72 h. The viscosity after storage in heat is determined on these samples. The remaining cartridges are conditioned at 100° C. in a circulating air drying cabinet for 4 h. The remaining tests are carried out on these samples.

Comparison Example 6 (not According to the Invention)

1,053.78 g (0.292 mol) polyester A are initially introduced into a 2 l beaker with a ground seal, melted at 130° C. and then dewatered for 1 h at 130° C. under a reduced pressure of 30 mbar (+/−10 mbar). 146.22 g (0.584 mol) 4,4'-diisocyanato-diphenylmethane (Desmodur® 44 M, Bayer AG, Leverkusen) are then added. After a stirring-in time of 30 min, an NCO content of 1.95% is determined (theory: 2.04%). The product is filled into aluminium cartridges with a filling weight of approx. 150 g in each case, and these are closed air-tight. The cartridges are conditioned at 100° C. in a circulating air drying cabinet for 4 h.

Comparison Example 7 (not According to the Invention)

790.34 g (0.219 mol) polyester A are initially introduced into a 2 l beaker with a ground seal, melted at 130° C. and then dewatered for 1 h at 130° C. under a reduced pressure of 30 mbar (+/−10 mbar). 109.5 g (0.438 mol) 4,4'-diisocyanato-diphenylmethane (Desmodur® 44 M, Bayer AG, Leverkusen) are then added. After a stirring-in time of 30 min, an NCO content of 1.99% is determined (theory: 2.04%). The amount equivalent to the NCO content, 148.46 g (0.422 mol), of N-(3-trimethoxysilylpropyl)aspartic acid diethyl ester prepared in accordance with EP-A 596 360, Example 5) is now slowly added dropwise into the apparatus, which is flushed with nitrogen, such that as far as possible the temperature does not rise by more than 10° C. When the total amount of N-(3-trimethoxysilylpropyl)aspartic acid diethyl ester has been added dropwise, the mixture is subsequently stirred further at 130° C. for approx. half an hour. Thereafter, 0.5 wt. % DMDEE is added as a curing catalyst. The batch is homogenized thoroughly and then filled into aluminium cartridges with a filling weight of approx. 150 g in each case, and these are closed air-tight. In each case one of these cartridges is stored at 100° C. in a circulating air drying cabinet for 4 h, 24 h, 48 h and 72 h. The viscosity after storage in heat is determined on these samples. The remaining cartridges are conditioned at 100° C. in a circulating air drying cabinet for 4 h. The remaining tests are carried out on these samples.

Determination of the Storage Stability of the Silane-Functional Moisture-Curing PU Hot-Melts:

The aluminium cartridges closed air-tight are removed from the drying cabinet after a storage time of 4 h, 24 h, 48 h and 72 h and the viscosity is determined at a measurement temperature of 100° C. with the aid of a Viskotester VT 550 rotary viscometer from Haake with the SV measuring cup and the SV DIN 2 measuring equipment. The results are summarized in Table 1.

As the results show, the hot-melt adhesive formulations based on polyester polyols and comprising the Lewis acid organometallic catalysts of the prior art (Comparison Example 3) are not heat-stable. After storage for 24 hours at 100° C., the viscosity has decreased to about half the viscosity of the non-catalysed Comparison Example 1. After 48 and 72 hours, the viscosity is only about 25% of that of the non-catalysed sample. This decrease in viscosity can be attributed to the irreversible degradation of the polyester chains by transesterification reactions with the alcohol split off from the alkoxysilane end groups (in this case methanol). The hot-melt adhesives prepared with the strongly basic bicyclic tertiary amine catalysts (DBU and DBN) of the prior art (Comparison Examples 4 and 5) likewise are not heat-stable. Even during a very short action of heat of 100° C. for 4 hours, the viscosity of these formulations decreases to half compared with the comparison product without a catalyst (Comparison Example 1). During a longer action of heat, the decrease in viscosity is even more dramatic. Here also, the decrease in viscosity is caused by an irreversible degradation of the polyester chains of the polyurethane prepolymers containing alkoxysilane end groups, as a result of which the hot-melt adhesive becomes unusable.

On the other hand, the hot-melt adhesives according to the invention with the tertiary amine catalyst A-1 (Example 1) show an excellent storage stability under exposure to heat. The viscosity decreases only insignificantly compared with the non-catalysed Comparison Example 1, even after a storage time of 72 hours at 100° C. Excellent glued joints can be produced with these hot-melt adhesives even after storage in heat.

Determination of the Heat Resistance

Beech wood sheets 40×20×5 mm in size which are stored at 23° C. and 50% rel. humidity are used to produce the test specimens. The cartridge with the product to be characterized is melted at 120° C. in a circulating air drying cabinet for 45 minutes and the contents are then applied, with the aid of a cartridge gun, as a worm of adhesive on to the wooden test specimens, which are clamped in a special mold. The mold is then firmly closed. The mold guarantees an overlapping length of 10 mm, a glued area of 2 cm² and a glued joint thickness of 0.8 mm. After storage at 23° C. and 50% rel. humidity for 24 hours, the test specimens are removed from the mold and then stored at 23° C. and 50% rel. humidity for a further 14 days. The heat resistance measurement is then carried out with the aid of in each case 5 test specimens. For this, the test specimens are suspended in a drying cabinet and loaded with a weight weighing 2,500 g. The starting temperature is 40° C. After 20 minutes, the temperature is increased constantly by 0.5° C./min up to 200° C. When the joint components become completely detached, the temperature in the drying cabinet at the time of the break is recorded. The results are summarized in Table 2.

As the data of Table 2 show, the hot-melt adhesive according to the invention containing alkoxysilane end groups of Example 1 has an excellent heat resistance compared with conventional reactive polyurethane hot-melts (Comparison Example 6).

The measurement of the heat resistance also shows that hot-melt adhesive formulations based on polyester polyols and comprising the Lewis acid organometallic catalysts of the prior art (Comparison Example 3) are not stable. The product comprising DBTL as a curing catalyst (Comparison Example 3) has a heat resistance of only 100° C., which can be attributed to the irreversible degradation of the polyester chains by transesterification reactions with the alcohol split off from the alkoxysilane end groups (in this case methanol). On the other hand, the hot-melt adhesive according to the invention of Example 1 has a heat resistance of above 200° C., since no transesterification reactions occur here and the adhesive is not irreversibly damaged.

Determination of the Tensile Shear Strength of Beech Wood Gluings

Beech wood sheets 40×20×5 mm in size which are stored at 23° C. and 50% rel. humidity are used to produce the test specimens. The cartridge with the product to be characterized is melted at 120° C. in a circulating air drying cabinet for 45 minutes and the contents are then applied, with the aid of a cartridge gun, as a worm of adhesive on to the wooden test specimens, which are clamped in a special mold. The mold is then firmly closed. The mold guarantees an overlapping length of 10 mm, a glued area of 2 cm² and a glued joint thickness of 0.8 mm. After approx. 30 minutes, the test specimens are removed from the mold and then stored at 23° C. and 50% rel. humidity until they are subjected to testing. Testing is carried out after 1 hour, 2 hours, 1 day, 7 days, 14 days and 28 days. 5 test specimens are produced and measured from each product and the average of the individual results is obtained. The results are summarized in Table 3.

Determination of the Peel Strength of Beech Wood/PVC Gluings

Beech wood sheets 30×120×4.0 mm in size which are stored at 23° C. and 50% rel. humidity and rigid PVC laminating film (Benelit RTF film) with the dimensions of 30×210×0.4 mm are used to produce the test specimens. The cartridge with the product to be characterized is melted at 120° C. in a circulating air drying cabinet for 45 minutes and the contents are then applied, with the aid of a cartridge gun, as a worm of adhesive to the upper end of the wooden test specimen. The adhesives are then spread over the beech wood test specimen with the aid of a doctor blade (grooved doctor blade, 150 μm). The glued area is approx. 30×90 mm. After a cooling time of 2 minutes at room temperature, the PVC film is laid on the beech wood test specimen such that the non-structured side of the rigid PVC laminating film lies flush on the side of the beech wood test specimen coated with adhesive. This composite is now pressed with the beech wood side facing downwards in a membrane press for 10 s under an effective pressure of approx. 1.5 bar at a temperature of 105° C. 3 test specimens are produced and measured from each product and the average of the individual results is obtained. Testing is carried out after 1 hour, 2 hours, 1 day, 7 days, 14 days and 28 days. The results are summarized in Table 4.

As the results of the beech wood and beech wood/rigid PVC gluings summarized in Tables 3 and 4 show, the non-catalysed silane-functional hot-melt adhesives cure only very slowly and build up strength of the glued joint only after several weeks (Comparison Examples 1 and 2). Nevertheless, the final strength which can be achieved lies significantly below the level reached with conventional isocyanate-functional polyurethane hot-melts (Comparison Example 6). On the other hand, the hot-melt adhesives according to the invention which are based on a crystallizing polyester polyol and comprise the catalyst A-1 (Examples 1 and 2) already have an adequate initial strength after 1 hour in the case of the beech wood gluing. In the case of the beech wood/rigid PVC gluing, an adequate initial strength is achieved after 1 day. The strengths which can be achieved can be greatly increased by modification according to the invention of the hot-melt adhesives by co-using a further crystallizing polyester or amorphous polyesters or polyesters which are liquid at room temperature and by admixing a polyether polyol, so that an adequate initial strength can also already be obtained after 1 hour in the case of the beech wood/rigid PVC gluing.

The final strengths (measured after 7-28 days) of the glued joints which were produced with the polyurethane hot-melt adhesives according to the invention having alkoxysilane end groups and comprising the catalyst A-1 are at the same level as the strengths which can be achieved with conventional isocyanate-functional polyurethane hot-melts (Comparison Example 6).

The tensile shear strengths of the beech wood gluings also show that Lewis acid organometallic compounds, such as e.g. DBTL, are not suitable as catalysts for curing of hot-melt adhesives which are based on polyester polyols and contain alkoxysilane end groups (Comparison Example 3). The initial strengths are significantly below those of the compositions according to the invention. Furthermore, it is found that on relatively long storage in heat, the strengths which can be achieved become significantly lower, which can be attributed to the irreversible degradation of the polyester chains by transesterification reactions with the alcohol split off from the alkoxysilane end groups (in this case methanol).

If DMDEE is used as the curing catalyst (Comparison Example 7), an increased initial strength (measured after 1 or 2 hours) compared with the non-catalysed hot-melt adhesive is indeed achieved, but the final strengths (measured after 7-28 days) are at the level of the non-catalysed hot-melt adhesive (Comparison Example 1) and are therefore significantly below the values which are obtained with the alkoxysilane-functional hot-melt adhesive according to the invention which comprises catalyst A-1 (Examples 1 and 2).

TABLE 1

Viscosities in mPa*s for the various examples and comparison examples, measured at 100° C. after storage in a circulating air drying cabinet at 100° C. for the stated duration.

| | | Viscosity in mPa*s, measured at 100° C. after storage at 100° C. for a duration of | | | |
|---|---|---|---|---|---|
| Example no. | Catalyst | 4 h | 24 h | 28 h | 72 h |
| Example 1 | A1 | 17,750 | 16,350 | 15,100 | 13,900 |
| Example 2 | A1 | 42,150 | 39,700 | 37,900 | 37,350 |
| Comparison Example 1 | none | 20,900 | 14,150 | 17,350 | 16,400 |
| Comparison Example 2 | none | 52,850 | 47,700 | 47,000 | 44,750 |
| Comparison Example 3 | DBTL | 27,100 | 7,445 | 3,725 | 3,410 |
| Comparison Example 4 | DBU | 9,215 | 3,760 | 2,350 | 2,420 |
| Comparison Example 5 | DBN | 11,200 | 4,990 | 3,060 | 2,620 |

TABLE 2

Heat resistance for a silane-functional moisture-curing PU hot-melt with catalyst A-1 as a curing catalyst (Example 1), an isocyanate-functional reactive PU hot-melt (Comparison Example 6) and a silane-functional moisture-curing PU hot-melt with DBTL as a curing catalyst (Comparison Example 3).

| Example no. | Heat resistance |
|---|---|
| Example 1 | >200° C. |
| Comparison Example 6 | 180° C. |
| Comparison Example 3 | 100° C. |

TABLE 3

Tensile shear strengths of beech wood gluings in N/mm$^2$ after curing at 23° C. and 50% rel. humidity over various curing times.

| Example no. | Catalyst | Storage time at 100° C. h in h | Tensile shear strength in N/mm$^2$ after a curing time of | | | | | |
|---|---|---|---|---|---|---|---|---|
| | | | 1 hour | 2 hours | 1 day | 7 days | 14 days | 28 days |
| Comparison Example 1 | none | 4 | 0.4 | 1.1 | 2.9 | 4.8 | 6.6 | 8.9 |
| Example 1 | A-1 | 4 | 2.6 | 3.1 | 6.5 | 11.9 | 11.7 | 11.4 |
| Example 2 | A-1 | 4 | 6.0 | 6.3 | 9.8 | 11.5 | 12.2 | 12.2 |
| Example 3 | A-1 | 4 | 3.4 | 4.1 | 5.0 | 6.8 | 9.4 | 9.2 |

TABLE 3-continued

Tensile shear strengths of beech wood gluings in N/mm² after curing at 23° C. and 50% rel. humidity over various curing times.

| Example no. | Catalyst | Storage time at 100° C. h in h | Tensile shear strength in N/mm² after a curing time of | | | | | |
|---|---|---|---|---|---|---|---|---|
| | | | 1 hour | 2 hours | 1 day | 7 days | 14 days | 28 days |
| Example 4 | A-1 | 4 | 1.0 | 1.1 | 1.6 | 4.1 | 5.8 | 7.0 |
| Example 5 | A-1 | 4 | 0.4 | 0.7 | 1.8 | 5.6 | 6.8 | 8.2 |
| Example 6 | A-1 | 4 | 4.2 | 4.9 | 5.8 | 8.7 | 9.8 | 11.8 |
| Comparison Example 3 | DBTL | 4 | 1.3 | 1.6 | 4.3 | 7.9 | 7.5 | 7.9 |
| Comparison Example 3 | DBTL | 72 | 0.7 | 0.4 | 1.5 | 2.9 | 4.2 | 4.5 |
| Comparison Example 6 | none | 4 | 6.4 | 7.3 | 10.2 | 11.9 | 13.0 | not determined |
| Comparison Example 7 | DMDEE | 4 | 2.4 | 2.6 | not determined | 7.3 | 8.8 | 8.9 |

TABLE 4

Peel strengths of beech wood / PVC gluings in N/mm after curing at 23° C. and 50% rel. humidity over various curing times

| Example no. | Catalyst | Peel strength in N/mm after a curing time of | | | | | |
|---|---|---|---|---|---|---|---|
| | | 1 hour | 2 hours | 1 day | 7 days | 14 days | 28 days |
| Comparison Example 2 | none | 0.1 | 0.1 | 0.42 | 2.20 + 1 x film torn off | 3.74 | film torn off |
| Example 2 | A-1 | 0.09 | 0.21 | 3.26 | film torn off | film torn off | film torn off |
| Example 3 | A-1 | 2.23 + 2 x film torn off | 1.12 + 2 x film torn off | film torn off | film torn off | film torn off | film torn off |
| Example 4 | A-1 | 1.49 | 1.17 | 2.74 | 4.99 | 4.88 wood frayed | 5.27 wood frayed |
| Example 6 | A-1 | 2.88 | 2.77 | film torn off | film torn off | film torn off | film torn off |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Alkoxysilane-functional composition, obtained by reaction of
A) polyurethane prepolymers obtained by reaction of
  i) at least one aromatic, aliphatic, araliphatic and/or cycloaliphatic diisocyanate
  with
  ii) at least one linear polyester polyol which is solid at room temperature,
and iii) optionally one or more amorphous linear polyester polyols and/or one or more linear polyester polyols which are liquid at room temperature, and optionally one or more linear polyether polyols,
  wherein the ratio of amounts of i) to ii) is chosen such that the molar ratio of NCO to OH is from 1.2 to 4.0, with
B) compounds containing alkoxysilane and amino or mercapto groups, of the general formula (I)

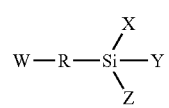

in which

X, Y and Z represent identical or different straight-chain or branched ($C_1$-$C_8$)alkyl radicals or cyclic ($C_3$-$C_8$) alkyl radicals or ($C_1$-$C_8$)alkoxy radicals, with the proviso that at least one of the radicals is a ($C_1$-$C_8$)alkoxy radical, R represents straight-chain or branched alkylene radicals having 1 to 8 carbon atoms or cyclic alkylene radicals having 3 to 8 carbon atoms, W represents either —SH or —NH—R'
  wherein
  R' represents hydrogen, straight-chain or branched alkyl radicals having 1 to 8 carbon atoms or cyclic alkyl radicals having 3 to 8 carbon atoms or aryl radicals or radicals of the general formula (II)

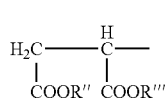

(II)

wherein
R" and R'" represent identical or different straight-chain or branched alkyl radicals having 1 to 8 carbon atoms or cyclic alkyl radicals having 3 to 8 carbon atoms
wherein the ratio of amounts of A) to B) is chosen such that 0.95 to 1.1 mol of amino or mercapto groups from B) are employed per mol of NCO groups from A),
and addition of
C) bis-(N, N'-dimethylaminoethyl) ether.

2. Composition according to claim 1, wherein the bis-(N, N'-dimethylaminoethyl) ether is employed in an amount of 0.1 wt. % to 1.5 wt. %, based on the reaction product of A) with B).

3. Composition according to claim 1, wherein the at least one linear polyester polyol which is solid at room temperature is at least partly crystalline.

4. Composition according to claim 1, wherein the at least one solid amorphous linear polyester polyol is a reaction component of the polyurethane prepolymer.

5. Composition according to claim 1, wherein the one or more linear polyester polyols which are liquid at room temperature and/or one or more linear polyether polyols is a reaction component of the polyurethane prepolymer.

6. An adhesive composition comprising the composition of claim 1.

7. Substrates glued using the composition of claim 1.

8. Process for the preparation of the alkoxysilane-functional compositions obtained by preparation of
A) polyurethane prepolymers obtained by reaction of
  i) at least one aromatic, aliphatic, araliphatic and/or cycloaliphatic diisocyanate with
  ii) at least one linear polyester polyol which is solid at room temperature,
and iii) optionally one or more amorphous linear polyester polyols and/or one or more linear polyester polyols which are liquid at room temperature and optionally one or more linear polyether polyols,
  wherein the ratio of i) to ii) is chosen such that the molar ratio of NCO to OH is from 1.2 to 4.0,
and reaction of the polyurethane prepolymers obtained under A) with
B) compounds containing alkoxysilane and amino or mercapto groups, of the general formula (I)

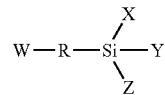

(I)

in which
X, Y and Z represent identical or different straight-chain or branched $(C_1-C_8)$alkyl radicals or cyclic $(C_3-C_8)$ alkyl radicals or $(C_1-C_8)$alkoxy radicals, with the proviso that at least one of the radicals is a $(C_1-C_8)$alkoxy radical,
R represents straight-chain or branched alkylene radicals having 1 to 8 carbon atoms or cyclic alkylene radicals having 3 to 8 carbon atoms,
W represents either —SH or —NH-R'
wherein
R' represents hydrogen, straight-chain or branched alkyl radicals having 1 to 8 carbon atoms, cyclic alkyl radicals having 3 to 8 carbon atoms, aryl radicals or radicals of the general formula (II)

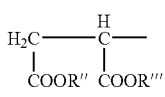

(II)

wherein
R" and R'" represent identical or different straight-chain or branched alkyl radicals having 1 to 8 carbon atoms or cyclic alkyl radicals having 3 to 8 carbon atoms
wherein the ratio of amounts of A) to B) is chosen such that 0.95 to 1.1 mol of amino or mercapto groups from B) are employed per mol of NCO groups from A),
and subsequent addition of
C) bis-(N, N'-dimethylaminoethyl) ether.

9. Moisture-curing, alkoxysilane-functional hot-melt adhesive composition, comprising the composition prepared according to claim 8, optionally together with one or more conventional additives for hot-melt adhesives.

10. Substrates glued using the moisture-curing hot-melt adhesive composition according to claim 9.

11. Process according to claim 8, wherein the at least one linear polyester polyol which is solid at room temperature is at least partly crystalline.

12. Process according to claim 8, wherein the at least one solid amorphous linear polyester polyol is a reaction component of the polyurethane prepolymer.

13. Process according to claim 8, wherein the one or more linear polyester polyols which are liquid at room temperature and/or one or more linear polyether polyols is/are a reaction component of the polyurethane prepolymer.

* * * * *